Patented Dec. 5, 1933

1,937,531

UNITED STATES PATENT OFFICE 1,937,531

PRODUCTION OF ANTHRAQUINONE DYESTUFFS

Donald G. Rogers, Hamburg, and James Ogilvie and Joyce H. Crowell, Buffalo, N. Y., assignors to National Aniline & Chemical Company, Inc., New York, N. Y., a corporation of New York No Drawing. Application June 22, 1928
Serial No. 287,641

18 Claims. (Cl. 260—59)

This invention relates to the production of anthraquinone coloring matters, and is particularly concerned with processes which partially decompose and transform the coloring matters obtainable by condensing a primary aromatic amine with a hydroxy anthraquinone or with a chlorhydroxyanthraquinone, or with mixtures of these substances, and their sulfonic acid derivatives, to other coloring matters.

It has heretofore been proposed to produce color bases by condensing one or more mols of an aromatic primary amine, e. g., aniline, toluidine, xylidine, etc., with one mol of purpurin, or of 2-chlorquinizarine; and then sulfonating the color base by means of any suitable sulfonating agent. The sulfonic acid derivatives of the color bases thus produced, when dyed on chrome mordanted wool, produce different shades or tints according to the number of mols of the primary aromatic amine condensed with the hydroxyanthraquinone body. For example, the sulfonic acid derivative of 2-anilino-1.4-dihydroxyanthraquinone dyes chrome mordanted wool reddish-black shades, while the sulfonic acid derivative of the dianilinohydroxyanthraquinone produces greenish-black shades. Similarly, the trianilino body gives greenish-blue-black shades.

In the manufacture of these coloring matters, the crude product is seldom a single product but is ordinarily composed of several products substituted in different degrees by arylino groups. It is difficult to effect the required degree of condensation in the formation of a color base which upon sulfonation gives a dyestuff which dyes fibres or fabrics, for example chrome mordanted wool, the shade desired. The present invention is primarily concerned with the conversion of a color base, or its sulfonic acid derivative, into one which has a lesser number of such groups, but without the elimination of all such groups. A desired coloring matter is not only often more advantageously produced in this manner, but it sometimes possesses properties not found in the dyestuff which is produced by direct condensation and sulfonation. This is probably due to the elimination of arylino groups from certain orientated positions and not others, and in consequence the occupied positions of the resulting product may or may not be the same as the occupied positions of the product produced by direct condensation, or direct condensation and sulfonation. In general, the new products have better solubility than those of the same or similar shades produced by direct condensation, and also give more level dyeings, and ordinarily stain celluloseacetate products and silks to a less degree.

According to the present invention, arylino groups, or sulfonated arylino groups, are eliminated from the arylino derivatives of a hydroxyanthraquinone, e. g., purpurin, or of 2-chlorquinizarine, by subjecting them to the action of a hydrolyzing or saponifying agent whereby a part or a portion, but not all, of said arylino groups, or their sulfonated derivatives, are removed. In the elimination of the arylino groups, the shade of the dyestuff changes and by this means the reaction may be more or less regulated and controlled. As hydrolytic or saponifying agents, acids, alkalies, or salts may be used, e. g., sulfuric acid, hydrochloric acid, caustic alkali, sodium chloride, etc.

The invention will be further illustrated by the following specific examples, but it will be understood that the invention is not limited thereto. The parts are by weight.

Example 1.—50 parts of the color base which is obtained by condensing 2-chlorquinizarine with aniline in the presence of boric acid, and which is composed largely of dianilinohydroxyanthraquinone having the following probable formula:

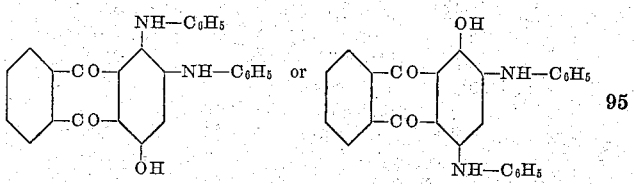

is sulfonated by heating it with 300 parts of sulfuric acid monohydrate at a temperature of about 45°–50° C. for about 3 or 4 hours or until a test portion of the solution upon being added to water gives a bluish-violet solution, and the isolated dye obtained in the form of the sodium sulfonate by salting out the test solution dyes chrome mordanted wool greenish-black shades. To the undiluted sulfonation mixture, there is added about 50–55 parts of ice or water, or an amount sufficient to produce a sulfuric acid having a strength of about 80-85 per cent, and the solution is heated to 90°-95° C. The color of the solution changes, and test portions upon dilution with water change from a bluish-violet color to a magenta-red, depending upon the length of time the solution is heated. The degree or amount of color change can be regulated and controlled by carrying out the reaction until a test portion upon dilution with water produces the same shade or color as a solution of the same strength of a previously prepared type. When the reaction is complete, the dyestuff is isolated and removed in any suitable or well-known manner. In this manner, a dyestuff may be obtained whose dyeing properties are similar, but not identical, to those produced by the direct sulfonation of a color base comprised chiefly of monoanilinodihydroxyanthraquinone having the following probable formula:

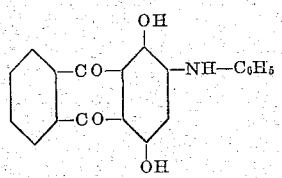

As a rule, the new products are more soluble in water, as the sodium salts, and stain cellulose-acetate and silk very little, if at all.

In this example, practically the same result can be obtained by diluting the sulfonation mixture with water to any desired strength of sulfuric acid, e. g., 3 to 90 per cent, and then heating the mixture; but sulfuric acids of such strength that the dyestuff remains in solution are preferably employed.

Instead of subjecting the sulfonic acid derivative of the color base to the action of hydrolytic agents, the color base itself may be thus subjected; for example, by heating it with sulfuric acid of a strength sufficient to dissolve it but insufficient to sulfonate it, or only slightly sulfonate it. For example, one part of the color base mentioned in Example 1 may be dissolved in 4 parts of sulfuric acid of about 80 per cent strength, and the solution may be heated to about 80°-85° C., for an hour or so, to effect a partial hydrolysis. Upon being added to water it precipitates a color base having a less amount of aniline in combination therewith than does the original color base. The aqueous solution, from which the precipitated color base is separated, contains the aniline, or most of it, which has been split off from the color base. Instead of recovering the partially hydrolyzed color base from the sulfuric acid solution resulting from the hydrolysis, by adding it to water, it may be sulfonated in the sulfuric acid solution; for example, the sulfuric acid solution may be fortified by adding to it stronger sulfuric acid or oleum, and the color base sulfonated in the usual manner.

*Example 2.*—10 parts of a sulfonic acid derivative of dianilinohydroxyanthraquinone having the following probable formula:

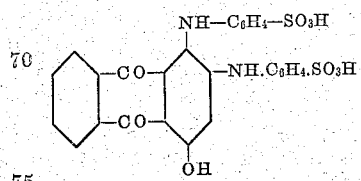 or 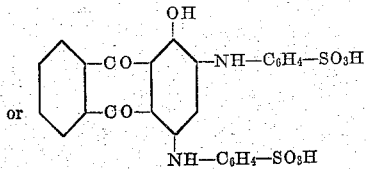

is heated to 85°-90° C. with 333 parts of a 3 per cent caustic soda solution until the color of this solution changes from a purple to a reddish blue, or, if desired, until it matches the shade of a previously prepared standard solution. The solution is cooled and the dyestuff is salted out in the usual manner. It dyes chrome mordanted wool much redder shades than the initial dyestuff.

Other alkaline reagents, such as sodium carbonate, caustic potash, etc., may be used. The strength of the alkaline solution can vary greatly, e. g., from 1 to 25 per cent or higher. Filtercakes, which are alkaline or acid in reaction, upon being dried, particularly over a long period of time and at elevated temperatures, also undergo change in color due to partial hydrolysis of the product.

It may be pointed out that the mono- and poly-anilino derivatives prepared from purpurin and from 2-chlorquinizarine are regarded by prior art as being identical.

We claim:

1. In the production of anthraquinone coloring matters, the improvement which comprises subjecting a dianilino-hydroxy-anthraquinone coloring matter to the action of a hydrolytic agent to produce a monoanilino-dihydroxy-anthraquinone coloring matter.

2. In the production of anthraquinone coloring matters, the improvement which comprises subjecting a dyestuff, which is a sulfonic acid derivative of the color base produced by condensing aniline with 2-chlorquinizarine in the presence of boric acid, to the action of a hydrolytic agent to produce a dyestuff which will dye chrome mordanted wool redder shades of gray to black than will the initial dyestuff.

3. In the production of anthraquinone coloring matters, the improvement as claimed in claim 2, and in which the hydrolytic agent employed is sulfuric acid.

4. In the production of an anthraquinone coloring matter, the process of converting a polyarylinoanthraquinone body into one containing a lesser number of arylino groups which comprises hydrolyzing a polyarylinoanthraquinone body by subjecting it to the action of a hydrolytic agent, and arresting the hydrolysis before the stage at which complete elimination of all arylino groups is reached.

5. In the production of an anthraquinone coloring matter, the process as claimed in claim 4, and in which the hydrolytic agent employed is sulfuric acid.

6. In the production of an anthraquinone coloring matter, the process of converting a polyarylinoanthraquinone body having a sulfo group in the aryl group of the arylino radical into one containing a lesser number of arylino groups containing a sulfo group in the aryl group of the arylino radical which comprises hydrolyzing a polyarylinoanthraquinone body having a sulfo group in the aryl group of the arylino radical by subjecting it to the action of a hydrolytic agent, and arresting the hydrolysis prior to the stage at which complete elimination of all arylino groups is reached.

7. In the production of an anthraquinone coloring matter, the process as claimed in claim 6, and in which the hydrolytic agent employed is sulfuric acid.

8. In the production of an anthraquinone coloring matter, the process of converting a sulfonated diarylino-hydroxy-anthraquinone to one containing a lesser number of arylino groups which comprises hydrolyzing a sulfonated diarylino-hydroxy-anthraquinone by subjecting it to the action of a hydrolytic agent, and arresting the hydrolysis prior to the stage at which complete elimination of all the arylino groups is reached.

9. In the production of an anthraquinone coloring matter, the process as claimed in claim 8, and in which the hydrolytic agent employed is sulfuric acid.

10. In the production of an anthraquinone coloring matter, the process as claimed in claim 4, and in which the hydrolytic agent employed is caustic alkali.

11. In the production of anthraquinone coloring matters, the improvement as claimed in claim 2, and in which the hydrolytic agent employed is caustic alkali.

12. In the production of a coloring matter, the process of converting a polyarylino-anthraquinone color base into one containing a lesser number of arylino groups which comprises hydrolyzing a polyarylino-anthraquinone color base by subjecting it to the action of a hydrolytic agent, and arresting hydrolysis before the stage at which complete elimination of all arylino groups is reached.

13. In the production of a coloring matter, the process of converting a diarylino-hydroxyanthraquinone to an arylino-hydroxyanthraquinone containing a lesser number of arylino groups which comprises hydrolyzing the diarylino-hydroxyanthraquinone by subjecting it to the action of a hydrolytic agent, and arresting the hydrolysis prior to the stage at which complete elimination of all the arylino groups is reached.

14. As a new product, an arylino-hydroxyanthraquinone body which, in the form of a sulfonic acid, dyes chrome mordanted wool a redder shade than the sulfonic acids of the related polyarylino-anthraquinone bodies resulting from the condensation of the corresponding hydroxyanthraquinone with the corresponding arylamine; which body, in the form of a sodium sulfonate, is more soluble in water than the sodium sulfonate of the arylino-anthraquinone body which, in the form of a sulfonic acid, dyes chrome mordanted wool the same shade as does said arylino-hydroxyanthraquinone, in the form of a sulfonic acid, and which is obtainable directly by the condensation of said hydroxyanthraquinone with said arylamine; and which body is substantially identical with a product obtainable by the partial elimination of arylino groups from a polyarylino-anthraquinone body, resulting from the condensation of said hydroxyanthraquinone with said arylamine, by incomplete hydrolysis of said polyarylino-anthraquinone body.

15. As a new product, an arylino-hydroxyanthraquinone body which contains at least one arylino group of the benzene series, but less arylino groups of the benzene series than the related polyarylino-anthraquinone bodies resulting from the complete condensation of the corresponding hydroxyanthraquinone with the corresponding arylamine of the benzene series; which body, in the form of a sulfonic acid, dyes chrome mordanted wool redder shades than the sulfonic acids of said related polyarylino-anthraquinone bodies; and which body is substantially identical with a product obtainable by the partial elimination of arylino groups from said related polyarylino-anthraquinone bodies by incomplete hydrolysis thereof.

16. As a new product, an arylino derivative of purpurin which, in the form of a sulfonic acid, dyes chrome mordanted wool redder shades than the sulfonic acids of the related polyarylino-anthraquinone bodies resulting from the condensation of purpurin with an arylamine of the benzene series; which arylino derivative of purpurin, in the form of a sodium sulfonate, is more soluble in water than the sodium sulfonates of the arylino-anthraquinone bodies which, in the form of the sulfonic acid, dye chrome mordanted wool the same shade as said arylino derivative of purpurin, in the form of sulfonic acid, and which is obtainable directly by the condensaton of purpurin with an arylamine of the benzene series; and which arylino derivative of purpurin is substantially identical with an arylino derivative of purpurin obtainable by the partial elimination of arylino groups from said polyarylino anthraquinone bodies by incomplete hydrolysis thereof.

17. As a new product, a sulfonated anilino derivative of purpurin which dyes chrome mordanted wool redder shades than the sulfonated polyanilino-anthraquinone bodies resulting from the condensation of purpurin with aniline in the presence of boric acid and sulfonation of the resulting condensation product, and which is substantially identical with the product obtainable by the partial elimination of anilino groups from said sulfonated polyanilino-anthraquinone bodies by incomplete hydrolysis thereof.

18. As a new product, an anilino derivative of purpurin having the following probable formula:

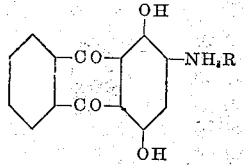

in which R represents a sulfonated or unsulfonated hydrocarbon radical of the benzene series, said product, in the form of its sulfonic acid, dyeing chrome mordanted wool redder shades than the sulfonated dianilino derivatives of purpurin, and said product being obtainable by subjecting the corresponding dianilino derivative of purpurin to hydrolysis by the action of a hydrolytic agent, and arresting the hydrolysis before the stage at which complete elimination of both anilino groups is reached.

DONALD G. ROGERS.
JAMES OGILVIE.
JOYCE H. CROWELL.